United States Patent
Narotamo et al.

(10) Patent No.: US 9,415,619 B2
(45) Date of Patent: Aug. 16, 2016

(54) DIFFUSION DECORATION TECHNOLOGY

(75) Inventors: Suriaprakash Narotamo, Queluz (PT); Charles Raymon Hill, Loudonville, OH (US); Jeff Qin, Zhuahi (CN); Zhong Wang, Zhu Hai (CN)

(73) Assignee: FLEXTRONICS AP, LLC, Broomfield, CO (US)

( * ) Notice: Subject to any disclaimer, the term of this patent is extended or adjusted under 35 U.S.C. 154(b) by 445 days.

(21) Appl. No.: 12/840,884

(22) Filed: Jul. 21, 2010

(65) Prior Publication Data
US 2011/0132529 A1 Jun. 9, 2011

Related U.S. Application Data

(60) Provisional application No. 61/267,634, filed on Dec. 8, 2009.

(51) Int. Cl.
| | | |
|---|---|---|
| *B29C 65/02* | (2006.01) | |
| *B29C 65/56* | (2006.01) | |
| *B32B 37/06* | (2006.01) | |
| *B32B 37/08* | (2006.01) | |
| *B32B 37/10* | (2006.01) | |
| *B32B 38/14* | (2006.01) | |
| *B44C 1/17* | (2006.01) | |
| *B41M 5/035* | (2006.01) | |
| *B29C 45/72* | (2006.01) | |
| *B29C 44/34* | (2006.01) | |

(Continued)

(52) U.S. Cl.
CPC ............ B41M 5/035 (2013.01); B29C 44/3415 (2013.01); B29C 45/72 (2013.01); B32B 37/1018 (2013.01); B41M 5/0358 (2013.01); B44C 1/1704 (2013.01); B29C 43/52 (2013.01); B29C 49/4823 (2013.01); B44C 1/24 (2013.01)

(58) Field of Classification Search
CPC .... B32B 37/1018; B44C 1/1704; B44C 1/24; B41M 5/035; B41M 5/0358; B29C 43/52; B29C 44/3415; B29C 45/72; B29C 49/4823
USPC .............. 156/240, 277, 285, 309.9, 381, 758
See application file for complete search history.

(56) References Cited

U.S. PATENT DOCUMENTS

| | | |
|---|---|---|
| 3,506,348 A | 4/1970 | Brodie |
| 3,871,293 A | 3/1975 | Valiela |

(Continued)

OTHER PUBLICATIONS

International Search Report and Written Opinion, International Application No. PCT/US2010/57837, dated: Jan. 31, 2011, 6 pages.

*Primary Examiner* — Sonya Mazumdar
(74) *Attorney, Agent, or Firm* — Haverstock & Owens LLP (57) ABSTRACT

Systems and methods for decoratively coating a substrate are disclosed wherein the ink is diffused into the substrate, as opposed to onto the substrate. Substrates are able to comprise metals, plastics, bamboo, wood, glass, and metals wherein such materials can also be pre-coated. A system for transferring a decorative image to a substrate comprises a chamber configured to receive a substrate, a means for securing a transfer medium containing the decorative image to be transferred, an optional vacuum source coupled to the chamber, and a heat source removably coupled to the chamber. The transfer is positioned face down onto a surface of the substrate, secured into position. The vacuum source may be used to evacuate the chamber to more tightly pull the transfer medium to the substrate. Then the substrate and transfer are heated, and the transfer medium ink diffuses into the substrate, thereby diffusing the image into the substrate.

8 Claims, 8 Drawing Sheets

(51) Int. Cl.
 *B29C 65/24* (2006.01)
 *B32B 38/10* (2006.01)
 *B29C 49/48* (2006.01)
 *B44C 1/24* (2006.01)
 *B29C 43/52* (2006.01)

(56) References Cited

U.S. PATENT DOCUMENTS

| | | | | |
|---|---|---|---|---|
| 4,202,663 | A * | 5/1980 | Haigh | B29C 49/52 101/464 |
| 4,325,629 | A * | 4/1982 | Ogata | G03B 27/47 355/27 |
| 4,447,373 | A * | 5/1984 | Chappell | A61F 6/08 156/146 |
| 4,465,728 | A * | 8/1984 | Haigh | B41M 5/035 264/129 |
| 4,664,672 | A | 5/1987 | Krajec et al. | |
| 4,872,827 | A * | 10/1989 | Noda | B29C 33/04 249/141 |
| 5,190,715 | A * | 3/1993 | Yamada | B29B 13/024 264/458 |
| 5,580,410 | A * | 12/1996 | Johnston | B41M 5/38207 156/230 |
| 6,322,654 | B1 | 11/2001 | Walter et al. | |
| 6,628,423 | B1 * | 9/2003 | Sasaki | B41J 13/226 101/232 |
| 6,635,142 | B1 * | 10/2003 | Stula | B41M 5/0355 156/230 |
| 6,743,109 | B2 | 6/2004 | Kammerer, Jr. et al. | |
| 6,776,100 | B2 * | 8/2004 | Cutcher | B41F 17/006 101/34 |
| 6,814,831 | B2 * | 11/2004 | Drake | B41M 5/0256 156/230 |
| 7,504,361 | B2 * | 3/2009 | Neely | B32B 17/06 428/210 |
| 2001/0027839 | A1 * | 10/2001 | Goffi | B41M 5/035 156/240 |
| 2004/0089407 | A1 * | 5/2004 | Halewood | B41F 16/00 156/230 |
| 2005/0070434 | A1 * | 3/2005 | Drake | B41M 5/0256 503/227 |
| 2007/0039682 | A1 | 2/2007 | Drake et al. | |
| 2010/0188471 | A1 * | 7/2010 | Howell | B41M 5/0358 347/217 |
| 2011/0205282 | A1 * | 8/2011 | Houjou | B41J 11/00 347/16 |

* cited by examiner

DIFFUSION DECORATION TECHNOLOGY

CROSS-REFERENCE TO RELATED APPLICATIONS

This application claims the benefit of U.S. Provisional Patent Application Ser. No. 61/267,634, filed Dec. 8, 2009 and entitled "DIFFUSION DECORATION TECHNOLOGY", under 35 U.S.C. §119(e) which is hereby incorporated by reference in it's entirety for all purposes.

FIELD OF THE INVENTION

The present invention relates to the field of transferring a decorative pattern to a workpiece. More specifically, the present invention relates to transferring a decorative pattern to a substrate by diffusing inks or coloring materials into the surface of the substrate.

BACKGROUND OF THE INVENTION

It is common for manufacturers to make their products from foamed, high gloss or textured plastic parts. Once the appropriate tooling is completed, the manufacturing methods produce parts with high production rates, high yields and low costs. However, the parts as manufactured contain no graphical enhancements to promote or distinguish manufacturers, enhance the marketing attractiveness of the end product, or otherwise customize the appearance of the parts.

Currently, manufacturers can create a distinctive image on an article by painting the article, placing a decal onto the article, or transferring an image onto the article.

Distinctive features may be added to an article of manufacture by painting the article using well-known techniques. Paint stations are a post-manufacturing process often using a template applied over the article and a single color of paint sprayed over the template. The paint goes onto, not into, the surface of the article. The paint is allowed to dry and/or the paint is heated to dry and cure the paint. The painting process is environmentally unfriendly as evidenced by the protective breathing equipment and eye protection equipment which one must wear when applying the paint. Yield can be low due to misplacement of the template, over-application of paint, or inconsistency in the paint material. The image detail is limited by the detail achievable with the template. The finished, painted surface may also require a post-treatment such as a sealer in order to protect against friction wear upon the painted image due to normal use of the finished product. Painting an article produces an article with an image of limited detail, usually in a single color, using an environmentally unfriendly process which requires significant post-manufacture processing and does not readily accommodate variation of the image painted on the article.

Another method of adding distinctive features to an article of manufacture is to apply a decal to the article after manufacture. A decal is one or more graphical images placed on a thin, adhesive material to be permanently applied to the surface of the article. Like painting of an image, a decal often requires a finish coat of clear sealer to protect the decal from wear or coming off in normal use of the finished product. Alternatively, a decal is sometimes made on a thicker, more durable material, with a stronger adhesive, in order to better withstand damage to the image from normal use of the finished product. Examples include the heavy brand name decals installed on my desktop and laptop computers. Decals can be difficult to accurately apply on the article without misapplying the decal or badge, and decals are subject to wear through normal use. Decals and badges strong enough to withstand some wear and tear are also thick enough to have ridges that catch on other items in normal use. In the event that the decal or badge comes off, the consumer is left with an inconvenient glue mess where the decal or badge has come off, detracting from, rather than enhancing, the appearance of the article.

Graphics can also be added to an article by wrapping the article in a transfer medium having a graphical image, wrapping a weft fabric around the transfer medium, encasing the wrapped article in a vacuum-sealable bag and removing the air from the bag. The bag, weft fabric, transfer medium and the wrapped article are heated to transfer the ink onto the article, and harden the ink by polymerization. The article may be pre-treated with a primer coat of paint, anodizing, or degreasing in order to avoid diffusion of the ink as it transfers to the article. Diffusion of ink is considered a defect in this process of image transfer. In some embodiments, this process utilizes a paper transfer medium, a weft fabric to enable air movement, and a separate vacuum-seal bag. A vacuum is drawn on the vacuum-seal bag, pulling the paper transfer tight to the article. The vacuum air flow is enable by voids in the weft fabric. In other embodiments, the transfer medium and the vacuum bag are one and the same. In this post-manufacturing process, the bags and transfers are made by third party vendors, which can add substantial time to the decorative process and reduce flexibility in customizing the graphic. In addition, the image is only transferred onto the surface of the article, not into the surface of the article.

Currently, manufacturers can create distinctive images on their articles of manufacture by painting the article, placing a decal onto a surface of the article, or transferring an image onto a surface of the article. None of these solutions provides for placing a multi-color high-resolution image both on, and in, an article of manufacture in a manner which accommodates personalization and customization with a short setup time, high yield, low cost, and that is environmentally friendly.

SUMMARY OF THE INVENTION

The presently-claimed invention acquires high-resolution, multi-color images for creating a decorative transfer medium and the decorative transfer medium can be applied to a surface of a wide variety of articles without changing the setup of the graphics application process and without incurring the environmental and waste problems of paint over-spray. In the presently-claimed invention, the decorative image is diffused into the surface of the article to be decorated, in contrast to decals applied onto the surface of the article which can catch on items during normal use, peeling away the decal and leaving a sticky glue surface where the decal has been peeled away. Diffusion dyes or inks permeate into, and below, the surface of the substrate such that the transferred image is both on, and in, the substrate material. The presently-claimed invention also can be used before, during, or after manufacture of an article to be decorated, unlike paint and decals which are typically applied at post-manufacturing, and then only by the manufacturer.

The presently-claimed invention provides systems and methods for detailed, multi-colored decoration of surface of an article by diffusing ink into the article surface. A decorative image is acquired for creating a heat transfer medium, the heat transfer medium is secured to the article in a chamber, heat is applied to the chamber, and the decorative image is transferred into the article by diffusing the inks of the transfer medium into the article to be decorated. A system for decorating a surface of an article can include a general purpose computing system and a scanner for acquiring and storing decorative images. The system can further include a multi-color printer for printing the decorative images onto a blank image transfer medium using diffusion inks, thereby creating a decorative transfer medium. The article to be decorated is placed on a mount. The dimensions of the mount are such that the mount holds the surface of the article to be decorated substantially parallel to an opening of a chamber. The mounted article is placed inside the chamber. The decorative transfer medium is larger than the opening of the chamber. When the decorative transfer medium is placed onto the opening, and thereby onto the article to be decorated, the printed face is directed toward the surface of the article to be decorated and such that the transfer medium overlaps the opening of the chamber. A retaining frame is placed over the transfer medium and coupled to the chamber thereby fixing the relative positions of the chamber, the decorative transfer medium, and the article to be decorated mounted inside the chamber. In some embodiments, the chamber, decorative transfer medium and the retaining frame form an air-tight chamber with the article to be decorated inside the air-tight chamber. The chamber is then mounted to a heating machine. In some embodiments, the heating machine includes a vacuum source and an optional air intake source, coupled to the chamber to draw a vacuum inside the chamber, thereby pulling the transfer down more firmly onto the surface of the article to be decorated. Valves coupled to the air intake and the vacuum source, and a vacuum pump, are able to control the level of vacuum inside the chamber. A heating source is then lowered over the chamber and secured into position. In some embodiments, the heating source is locked into position to facilitate personnel safety while the heating source is in the ON state. The heat source is applied to the decorative transfer medium, chamber, and article to be decorated for a predetermined heating cycle. When the heating cycle is complete, the heat source can be removed and the chamber allowed to cool. When the chamber is cool, the retaining frame is removed, the used decorative transfer medium is discarded or recycled, and the finished decorated article is removed. In some embodiments, the vacuum pump, air intake valve and vacuum source valve can be operated to draw an air flow through the chamber in order enhance the cooling of the chamber. In some embodiments, a vent duct in the heat source vents heat from the heat source at the end of the cooling cycle to assist in cooling the heat source thereby facilitating personnel safety. In some embodiments, the heat source, vacuum pump, air intake valve and vacuum valve are interfaced to a control system to automate any, or all, of the process steps. One skilled in the art will recognize that a complete commercial system can include additional sensors, interlocks and controls including a vacuum sensor, a chamber air temperature sensor, a chamber frame temperature sensor, an over-temperature switch, an emergency shut off or "kill" switch, a heat source position interlock, and keyswitch lockout control to facilitate system operation and personnel safety. One skilled in the art will further recognize that the control system can be implemented, or controlled by, a suitably programmed general purpose computing system. The programmed general purpose computing system can include the computing system used to acquire, store and print decorative images.

The types of articles which can be decorated by the presently-claimed invention are numerous and varied. Materials which can be decorated by the presently-claimed invention include metals, plastics, bamboo, wood, glass, and metals wherein such materials can also be pre-coated. Some typical examples articles which can be decorated include decorating parts of well-known electronics devices including cell phones, digital music players, laptop computers, decorative car parts, kitchen appliances, tiles, and lamp bases. The systems of the presently-claimed invention are well-suited to producing decorated articles in a manufacturing process, or as a separate after-market customization service. In a manufacturing process, a manufacturer can receive orders for customized decoration and divert a portion of their manufacturing product line output to a decorative customization line where certain parts are decorated, and the finished article is then delivered to a retailer or end customer. In an after-market customization process, a customer can bring an article to be decorated to a shop where it is disassembled, a part or parts can be decorated per customer requirements, reassembled, and delivered to the customer. In addition, third-party parts suppliers can order unfinished parts from a manufacture to be decorated in accordance with custom orders, decorate the parts, and ship the decorated parts back to the manufacturer, to a customization house, or to an end user. Further, the systems and methods for creating a decorative transfer medium can be entirely separate from the systems and methods for decorating an article of manufacture. For example, one vendor can specialize in taking customer orders for, and creating, decorative transfer media and another vendor can specialize in using the decorative transfer media obtained from the first vendor to decorate articles.

In one aspect, a method of decorating an article by diffusion comprises placing the article to be decorated into a chamber having a support for the article, placing a transfer medium having a decorative image comprising diffusion ink onto a face of the article to be decorated, securing the transfer medium to the chamber, and heating the chamber to a selected temperature for a selected time. In some embodiments, the transfer medium is removed after heating the chamber. In some embodiments the process further comprises securing the transfer medium to the chamber in an air-tight manner, and changing the air pressure within the chamber. In some embodiments, heating the chamber to a selected temperature comprises heating the chamber to a temperature in the range of 120° C. to 300° C. In some embodiments, heating the chamber for a selected time comprises heating for a time in the range of 5 minutes to 45 minutes.

In another aspect, a method of creating a transfer medium having a decorative image comprises acquiring the decorative image to be used in decorating the article, and imprinting the decorative image onto a blank transfer medium with diffusion ink, thereby creating an image transfer medium having a decorative image. In some embodiments, acquiring a decorative image comprises digitally acquiring the decorative image. In some embodiments, digitally acquiring the decorative image comprises receiving the decorative image as a file via a network. In some embodiments, the network is the Internet, a cellular network, a packet switched network, an intranet, a local area network, or a public switched telephone network. In some embodiments, imprinting the decorative image comprises imprinting using diffusion ink, and in some embodiments imprinting the decorative image comprises usage of multiple colors of ink. In some embodiments, imprinting the decorative image onto an image transfer medium comprises printing using a dye diffusion ink printer.

In yet another aspect, a machine for transferring a decorative image on a transfer medium to an article to be decorated comprises a chamber having a support for receiving the article, means for securing the transfer medium position in relation to the article to be decorated, and a heat source, removably thermally coupled to the chamber. In some embodiments, means for securing the transfer medium to the chamber can comprise an air-tight connection of the transfer medium to the chamber. In some embodiments, the machine further comprises a vacuum source coupled to the chamber. In some embodiments, the machine further comprises a heat removal system coupled to the chamber.

In still another embodiment, a system for transferring a decorative image onto an article to be decorated comprises a computing system coupled to a network, a scanner, and a printer in communication with the computing system, wherein the printer is loaded with an image transfer medium and a supply of ink, and a machine for transferring a decorative image on a transfer medium to an article to be decorated. The machine includes a chamber having a support for receiving the article, means for securing the transfer medium to the chamber, in a fixed position in relation to the article to be decorated, a heat source removably coupled to the chamber, and a vacuum source coupled to the chamber. In some embodiments, means for securing the transfer medium to the chamber comprise a substantially air-tight seal. In some embodiments, the system is coupled to a network wherein the network is one from the group consisting of the Internet, a cellular network, a packet switched network, an intranet, a local area network, and a public switched telephone network.

DETAILED DESCRIPTION OF THE DRAWINGS

Embodiments of the present application are directed to systems and methods for transferring a decorative image to an article to be decorated. One of ordinary skill in the art will recognize that the specific embodiments disclosed are illustrative, and not to be construed as limiting in any way. It will be appreciated that numerous implementation-specific decisions must be made in order to comply with applicable regulatory and safety requirements, business requirements and design-specific goals and that such design nuances would be a well within the knowledge of one of ordinary skill who routinely designs within such constraints.

A system for transferring a decorative image to an article to be decorated according to the presently-claimed invention enables a manufacturer, an after-market customizer or an end user to decorate one or more parts of an article so as to personalize the article. For example, a person may want to decorate their laptop computer case with a picture of their family, or a cell phone cover with an image that they developed from original art. Such decorations personalize an article so that it is more easily distinguished from the numerous other like units on the market. Thus, a system for transferring a decorative image to an article to be decorated first includes means to acquire an image. Such means include obtaining the image from a list of stored images which a vendor may offer, uploading a personalized image as a part of a decoration order by a customer, downloading images from a network such as the Internet, transferring images from a camera, capturing a frame of video from a video camera, and scanning an image with a scanner. Once the image is acquired, the image is printed onto a blank transfer medium by a diffusion ink printer, producing a decorative transfer medium. A machine which uses the decorative transfer medium includes a chamber for holding the article which is to be decorated and the decorative transfer medium, a heat source, and a vacuum source. A mount is made or selected for the specific part which is to be decorated. When the article to be decorated is mounted on the mount, and the mount is placed in the chamber, the surface to be decorated is substantially parallel to, and can protrude slightly out of, an opening in the chamber. The decorative transfer is placed, ink down, onto the surface to be decorated, and a retaining frame is placed over the decorative transfer and onto the chamber, fixing the relative positions of the chamber, the article, and the decorative transfer medium. The chamber is mounted to the machine and a heat source is brought down in contact, or nearly in contact, with the decorative transfer medium. A heat cycle is started, and is followed by an optional cooling cycle. During the heat cycle, the diffusion ink is transferred from the decorative image transfer medium to the surface of the article to be decorated, diffusing the ink into the surface of the article to be decorated, and then at least partially heat-cured to stabilize the transferred image. The heat source is then removed from the chamber, the chamber is removed from the machine, the retaining frame is removed from the chamber, the used decorative transfer medium is discarded or recycled, and the finished part is removed from the chamber. In some embodiments, the chamber is a fixed part of the machine which is not removed and replaced.

Figure 1:
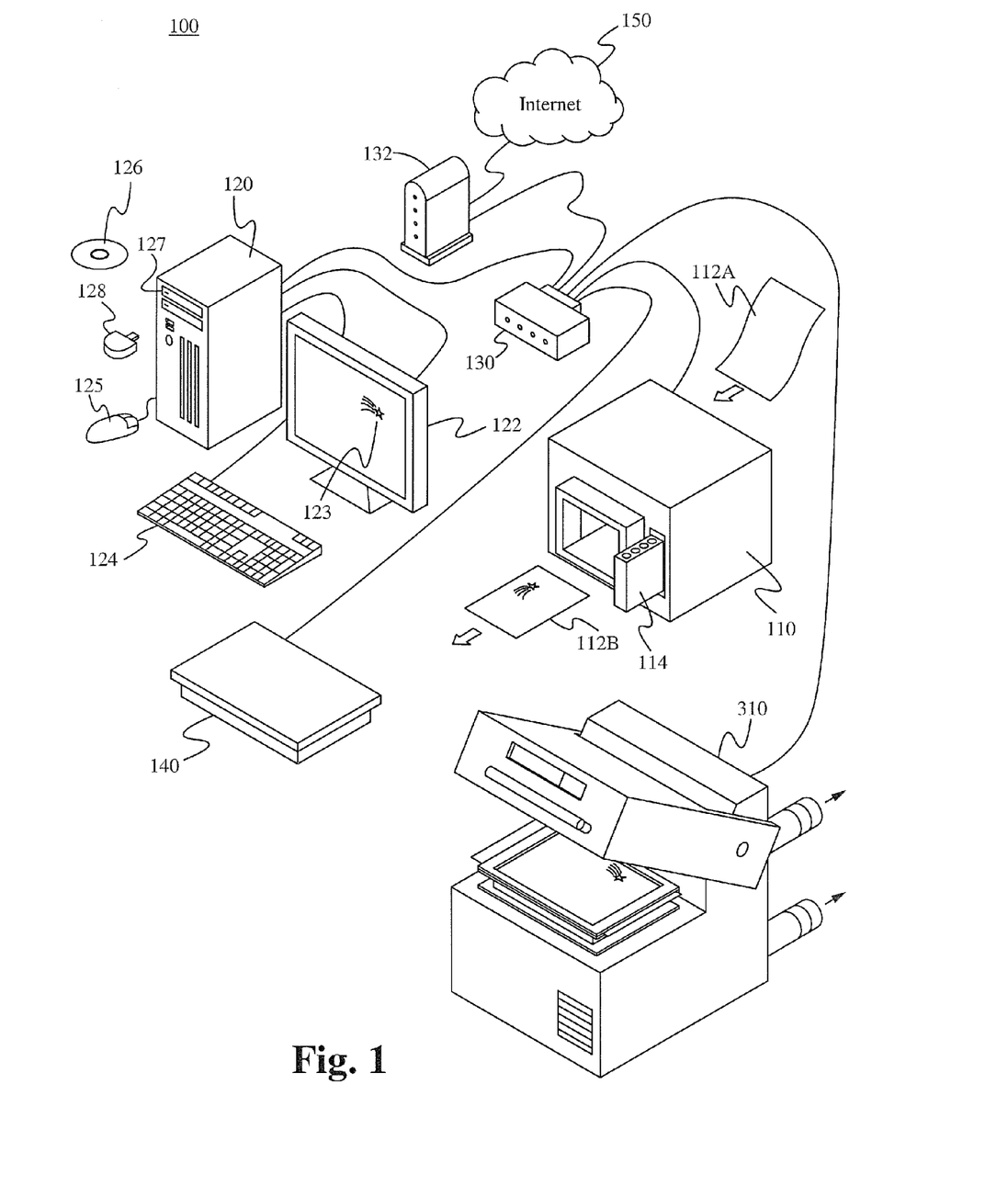
FIG. 1 illustrates a diagram of a system for transferring a decorative image to an article to be decorated according some embodiments.

FIG. 1 illustrates a diagram of a system for transferring a decorative image 123 to an article to be decorated according to some embodiments. The system 100 includes a dye diffusion transfer printer 110, a personal computing system 120, a router 130, and a scanner 140. The dye diffusion transfer printer 110 includes dye diffusion ink cartridges 114. The dye diffusion transfer printer 110 receives blank image transfer media 112A, receives the decorative image from the personal computer 120 which is communicatively coupled to the dye diffusion transfer printer 110 via the router 130, and prints the decorative image using the dye diffusion inks 114 to create the decorative image transfer medium 112B. Alternatively, the dye diffusion transfer printer 110 is able to receive the decorative image from the scanner 140. The personal computer 120 is a conventional computing device and includes a monitor 122, a keyboard 124 and a mouse 125 or other input devices known in the art. The personal computer 120 is communicatively coupled to the scanner 140, the dye diffusion transfer printer 110 and the network 150 via the router 130. The router 130 is further able to be coupled to the network 150 via a cable modem 132 or like communication device. The personal computer 120 is able to receive the decorative image 123 from the scanner 140, a portable storage medium such as a flash memory stick 128, a CD-ROM 126, a local hard drive 127, or via the network 150 by direct customer uploading, via email as an attachment, or other network transfer means. The system 100 further comprises a machine 310 for transferring a decorative image 123 on a transfer medium 112B to an article to be decorated (not shown), as further described in FIG. 3.

Figure 2A:
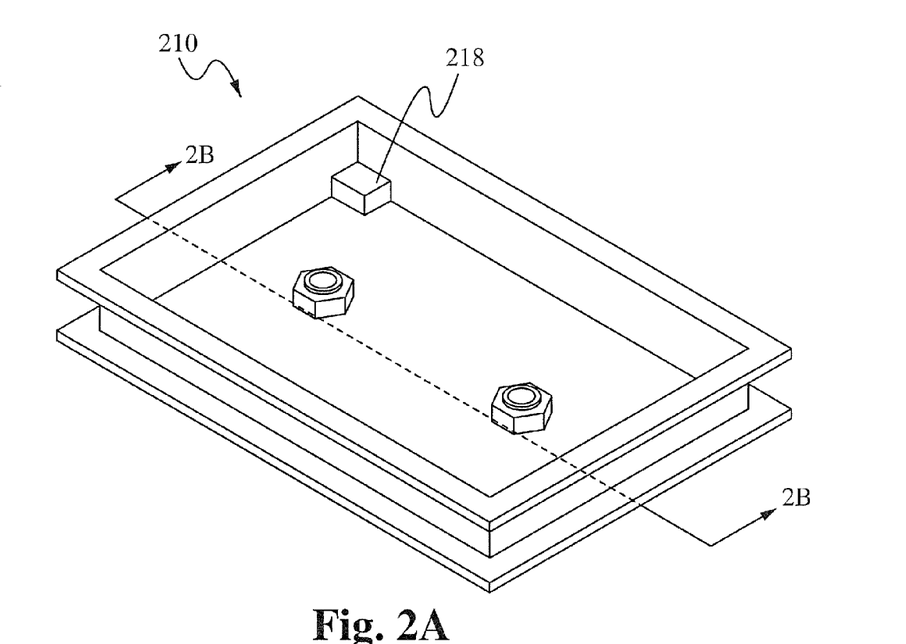
FIG. 2A illustrates a diagram of a chamber of a machine for transferring a decorative image on a transfer medium to an article to be decorated according to some embodiments.
Figure 2B:
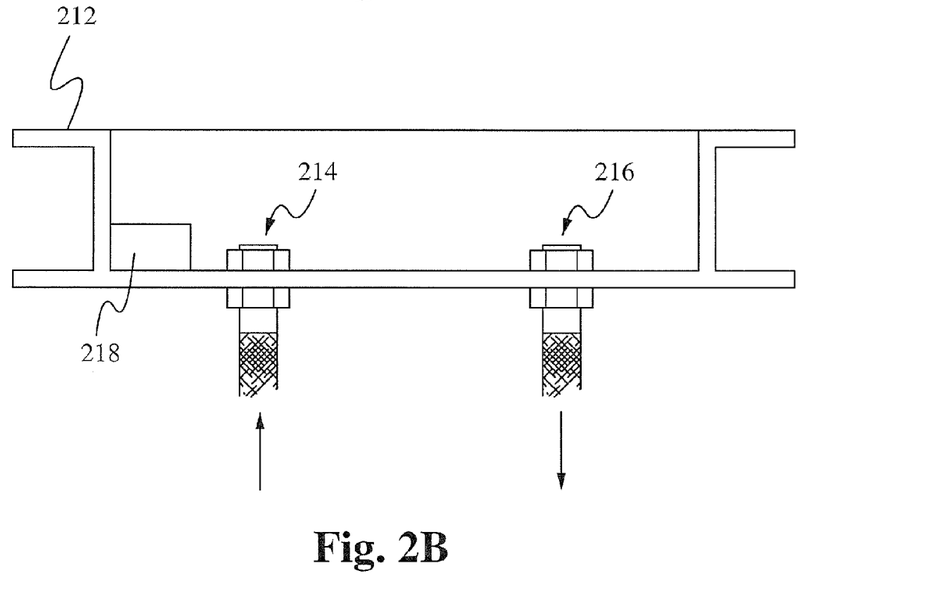
FIG. 2B illustrates a diagram of a section view of the inside of a chamber of a machine for transferring a decorative image on a transfer medium to an article to be decorated according to some embodiments.
Figure 2C:
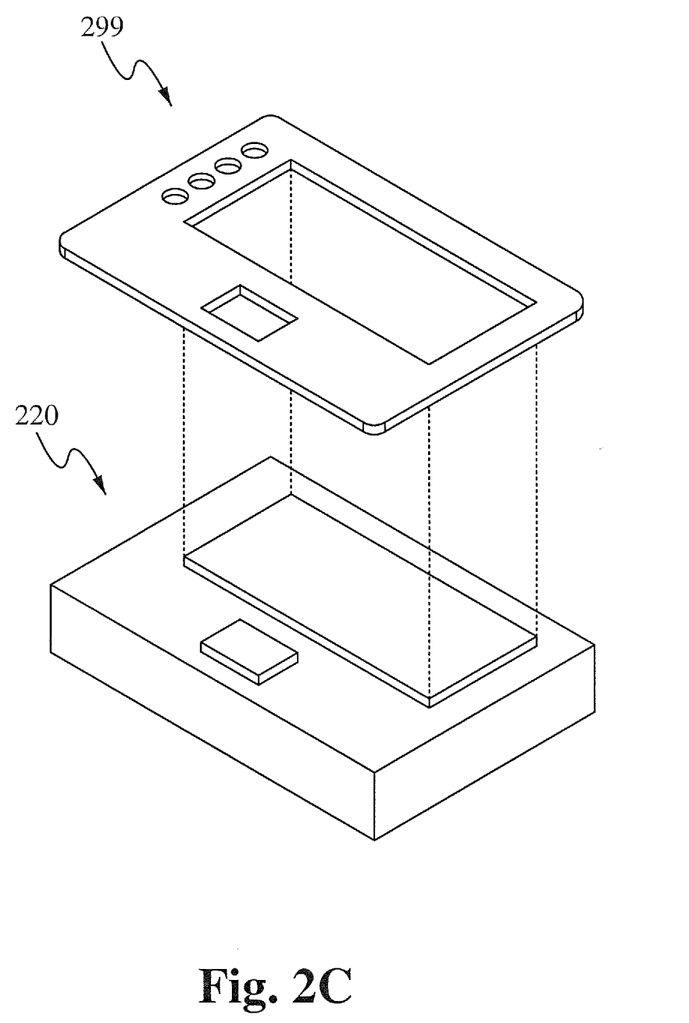
FIG. 2C illustrates a diagram of the support for an article to be decorated with the article to be decorated according to some embodiments.
Figure 3:
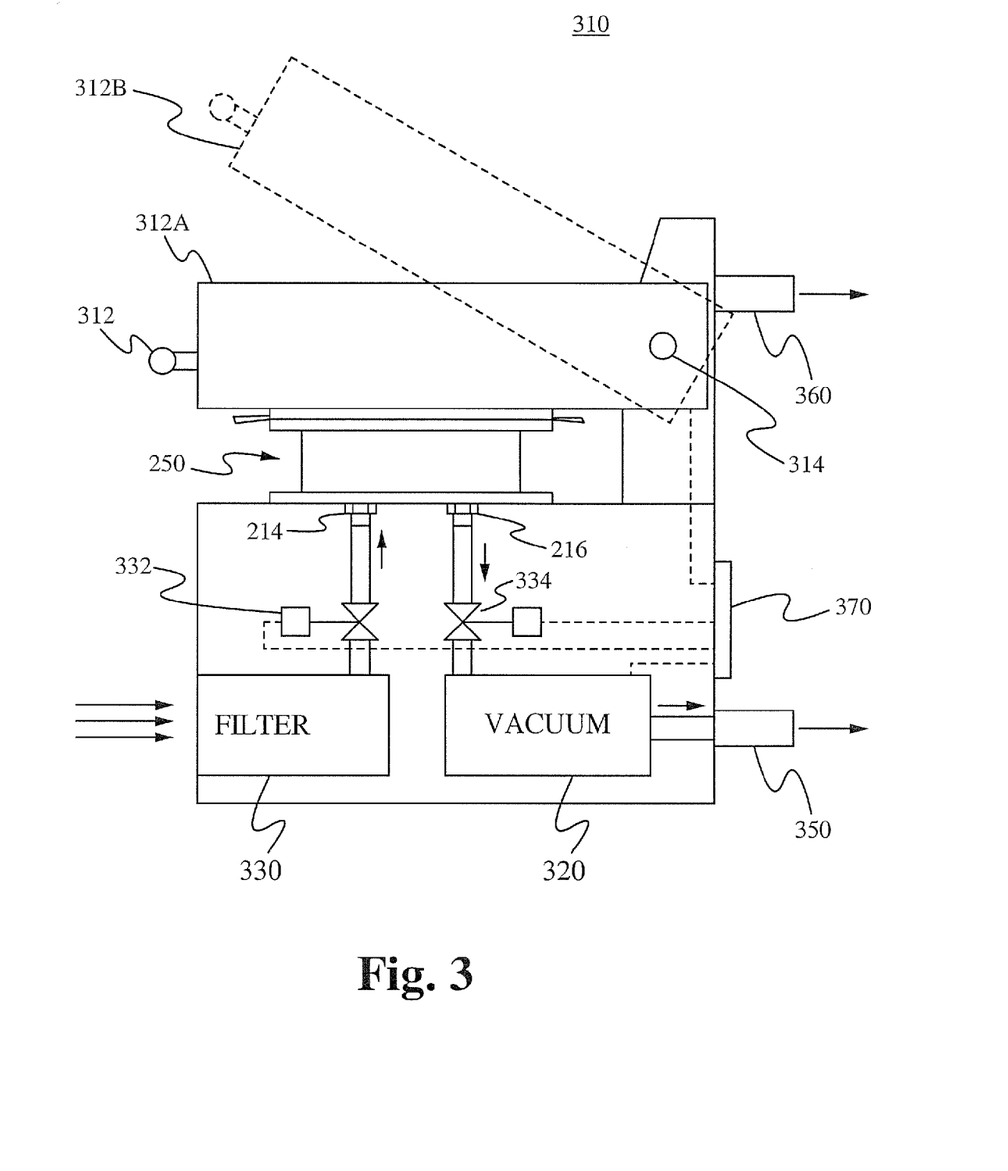
FIG. 3 illustrates a diagram of the internal components of a machine for transferring a decorative image on a transfer medium to an article to be decorated according to some embodiments.

FIG. 2A illustrates a diagram of a chamber of the machine 310 (FIGS. 1 and 3) for transferring a decorative image 123 (FIG. 1) on a transfer medium 112B (FIG. 1) to an article to be decorated according to some embodiments. FIG. 2B illustrates a diagram of a section view of the inside of a chamber 210 of the machine 310 (FIGS. 1 and 3) for transferring a decorative image on a transfer medium to an article to be decorated according to some embodiments. The chamber 210 comprises a flanged frame 212. The flanges on the frame facilitate sealing the chamber 210 with the machine 310, on the bottom side, and a heat source 312 (FIG. 3), on the top side. Details of the internal components of the machine 310 are shown in FIG. 3, described below. In some embodiments, the frame 212 may be flangeless and utilize other known means for sealing the chamber to the machine 310 (FIGS. 1 and 3) and the heat source 312 (FIG. 3) such as specially formed gaskets or O-rings. In some embodiments, the chamber 210 includes a sensor block 218. In some embodiments the sensor block 218 includes a temperature sensor and a vacuum sensor. The sensor block 218 is able to be interfaced to the control electronics 370, discussed further with respect to FIG. 3, below. In some embodiments, the flanged frame 212 is configured to be coupled to a selectable clean air intake 214 and a selectable vacuum source 216 which are discussed in more detail in FIG. 3, below. The flanged frame 212 is configured to receive a support 220 for an article to be decorated 299 as shown in FIG. 2C.

Figure 2D:
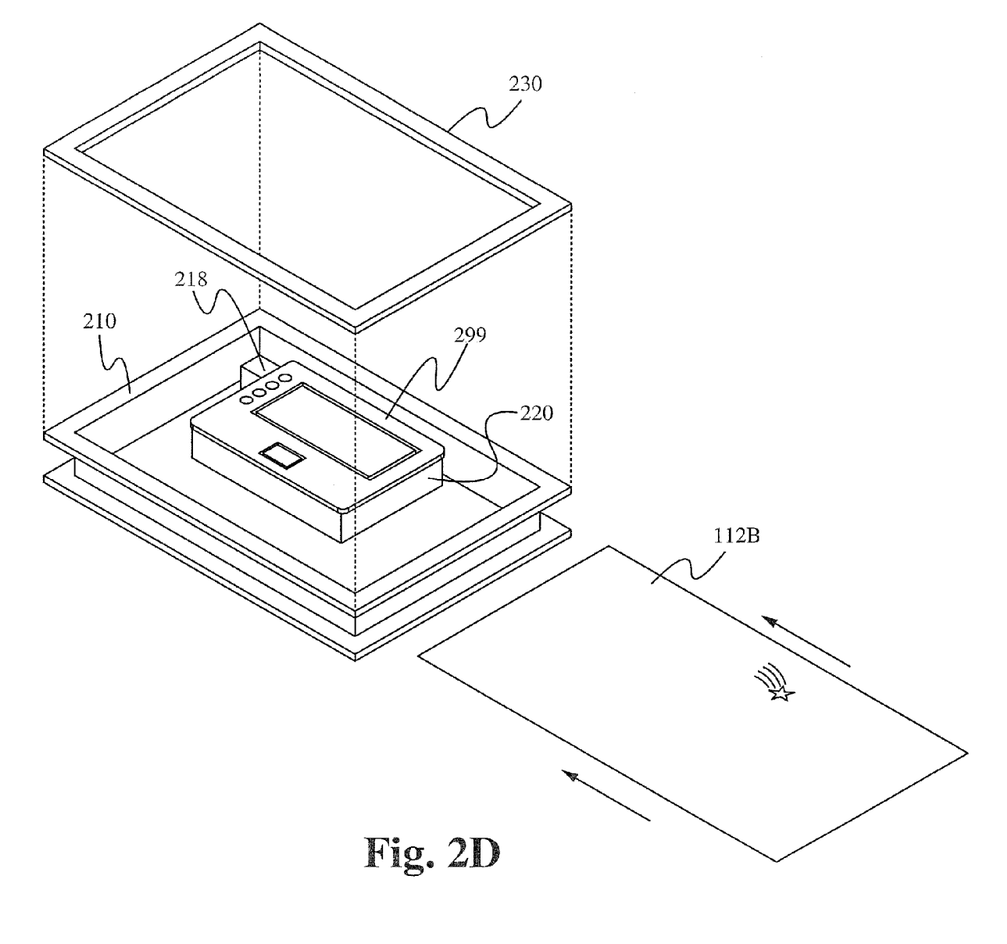
FIG. 2D illustrates a diagram of the chamber of a machine for transferring a decorative image on a transfer medium to an article to be decorated, including the transfer medium and the retaining frame, according to some embodiments.

FIG. 2D illustrates a diagram of the chamber 210 of the machine 310 (FIGS. 1 and 3) for transferring a decorative image on a transfer medium to an article to be decorated, including the decorative transfer medium 112B (FIG. 1) and a retaining frame 230, according to some embodiments. The article to be decorated 299 is shown mounted on the support 220 (FIG. 2C) inside of the chamber 210. The support positions the article to be decorated such that the surface of the article to be decorated is substantially parallel with an opening of the chamber. Then, the decorative transfer medium 112B (FIG. 1) containing the decorative image to be transferred is placed over the surface of the article to be decorated 299 with the dye diffusion ink surface of the decorative transfer medium directed to contact the surface of the article to be decorated 299. The retaining frame 230 is removably coupled, over the decorative transfer medium, to the chamber 210 thereby holding the decorative transfer medium tightly over the surface of the article to be decorated, and holding the decorative transfer medium in a fixed position in relation to the item to be decorated and the surface by means of the retaining frame. The method of coupling the retaining frame 230 to the chamber 210 is able to be substantially air tight for applications where the vacuum source 216 (FIG. 2B) is to be used. The method of coupling can be any suitable mechanical removable coupling means, including but not limited to threaded fasteners, C-clamps or clips, magnetic coupling, or mechanical pressure upon the retaining frame 230.

Figure 2E:
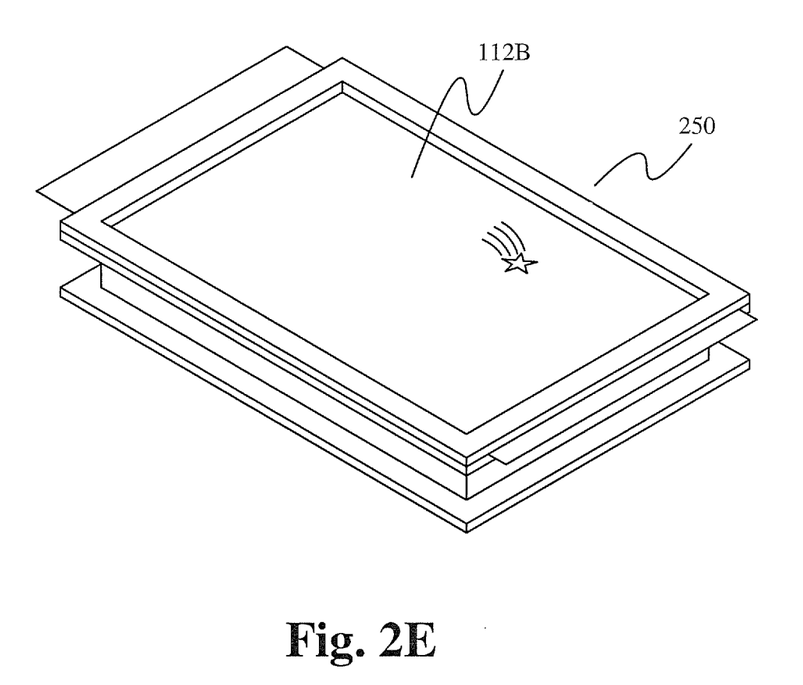
FIG. 2E illustrates a diagram of an assembled chamber of a machine for transferring a decorative image on a transfer medium to an article to be decorated, according to some embodiments.

FIG. 2E illustrates a diagram of an assembled chamber 250 of the machine 310 (FIGS. 1 and 3) for transferring a decorative image on a decorative transfer medium to an article to be decorated 299 (FIGS. 2C and 2D), according to some embodiments. The assembled chamber 250 is able to be mounted on the machine for transferring a decorative image on a transfer medium to an article to be decorated 310. In some embodiments, the chamber 210 (FIGS. 2A, 2B, and 3) is permanently fixed to the machine 310.

Figure 2F:
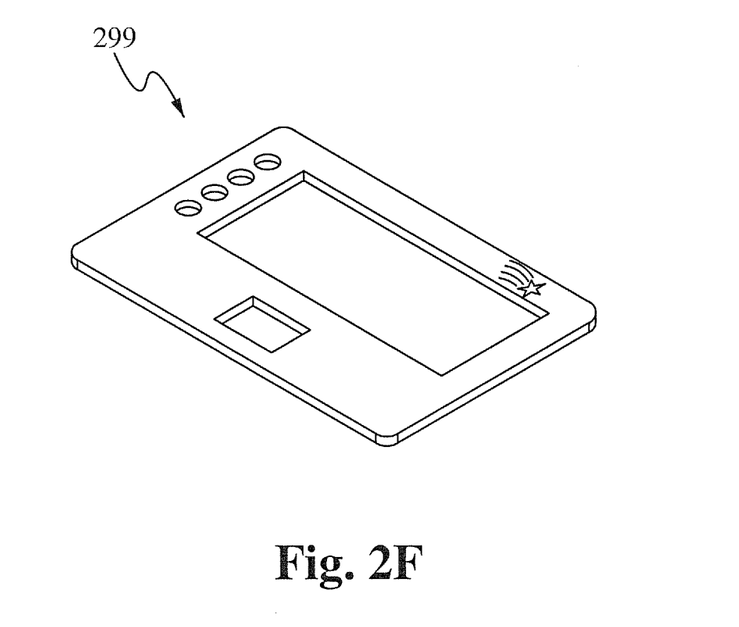
FIG. 2F illustrates a diagram of a finished article having received a decorative image transferred to the article in accordance with the process described herein, in some embodiments.

FIG. 2F illustrates a diagram of a finished article 299 having received the decorative image transferred to the article in accordance with the process described herein, in some embodiments.

FIG. 3 illustrates a diagram of the internal components of a machine 310 for transferring a decorative image on a decorative transfer medium to an article to be decorated according to some embodiments. The assembled chamber 250 is removably coupled to the machine 310. If the clean air source 214 and/or vacuum source 216 are to be used, then the assembled chamber 250 is removably coupled to them on the machine 310. In some embodiments, the chamber 210 (FIG. 2D) is permanently coupled to the machine 310, and the mount 220 (FIG. 2D), the article to be decorated 299 (FIG. 2D), the decorative transfer medium 112B (FIG. 2D) and the retaining frame 230 (FIG. 2D) are assembled onto the permanently coupled chamber 210 (FIG. 2D) to form the assembled chamber 250. In embodiments where the chamber 210 (FIG. 2D) is permanently coupled to the machine 310, the clean air source 214 and the vacuum source 216 are also permanently coupled to the chamber 210, for convenience. One skilled in the art would recognize that the clean air intake 214 and vacuum intake 216 can also alternatively also be removably coupled (not shown) to the chamber 210. The lower housing of the machine 310 can comprise a clean air intake filter 330 for drawing cooling air to the assembled chamber 250, according to some embodiments. An air intake valve 332 is able to be closed to retain the heat inside the assembled chamber 250 during heating, and to maintain a vacuum in the assembled chamber 250 in the event that the vacuum source 216 is used. A vacuum pump 320 is able to draw a vacuum on the chamber 250 in order improve the physical contact between the transfer medium 112B (FIG. 1) and the article to be decorated 299 in the chamber 250. The vacuum inside of the chamber effectively pulls the decorative transfer medium more tightly against the mounted article to be decorated than ambient air pressure, thereby improving the transfer of diffusing inks into the surface to be decorated. If the vacuum source 216 is to be used, the air intake valve 332 is closed, a vacuum valve 334 is opened, the vacuum pump 320 is turned on, and a vacuum is created within the assembled chamber 250. When the desired level of vacuum is achieved, the vacuum pump 320 is able to be turned off or throttled back to maintain the vacuum in the chamber 250. The vacuum pump 320 is able to exhaust the air removed from the assembled chamber 250 out through a vacuum exhaust 350 by opening the air intake valve 332, which draws cool air from outside the machine 310, into the filter 330, through the open valve 332, into the chamber 250 via connection 214, and out through the vacuum connection 216, vacuum valve 334, into vacuum pump 320 and out the vacuum exhaust 350, thereby speeding the cooling of the chamber and the article being decorated.

After the assembled chamber 250 is removably coupled to the machine 310, a heat source 312 is lowered from a position 312B down to a position 312A, in close proximity or contact with the assembled chamber 250. In some embodiments, the heat source 312 is rotatably coupled to the machine 310 at a point 314, to facilitate positioning of the heat source 312. The heat source 312 can be any conventional heat source such as an electrical heater, gas heater, microwave, laser, infrared lamp, or other heat generating device. The heat source 312 initiates a heat cycle wherein the heat source is brought to a selected temperature for a selected time, depending upon the article to be decorated 299 within the assembled chamber 250. In some embodiments, the heat source 312 is able to be locked into the position 312A during the heating cycle for personnel safety. A heat cycle releases the diffusion inks from the decorative transfer medium to the surface of the article to be decorated, diffusing the ink into the surface of the article to be decorated. At the completion of the heat cycle, hot air within the heat source 312 is able to be exhausted out of a heat exhaust 360. In some embodiments, the clean air intake valve 332, the vacuum source valve 334, the vacuum pump 320 and the heat source 312 are interfaced to an electronics control interface 370. The electronics control interface 370 is able to be interfaced to a personal computer 120 (FIG. 1), either directly or via a router 130 (FIG. 1), for the purpose of automating the operation of the machine 310. Automating the operation of the machine 310 includes the computer 120 setting the heat cycle parameters, time and temperature, the vacuum requirements, if any, sensing of the heat source position, 312A or 312B, locking and unlocking the heat source 312 in a position, detecting the heat source position and lock status before starting the heat cycle, and sensing the temperature within the assembled chamber 250 and the heat source 312.

Figure 4:
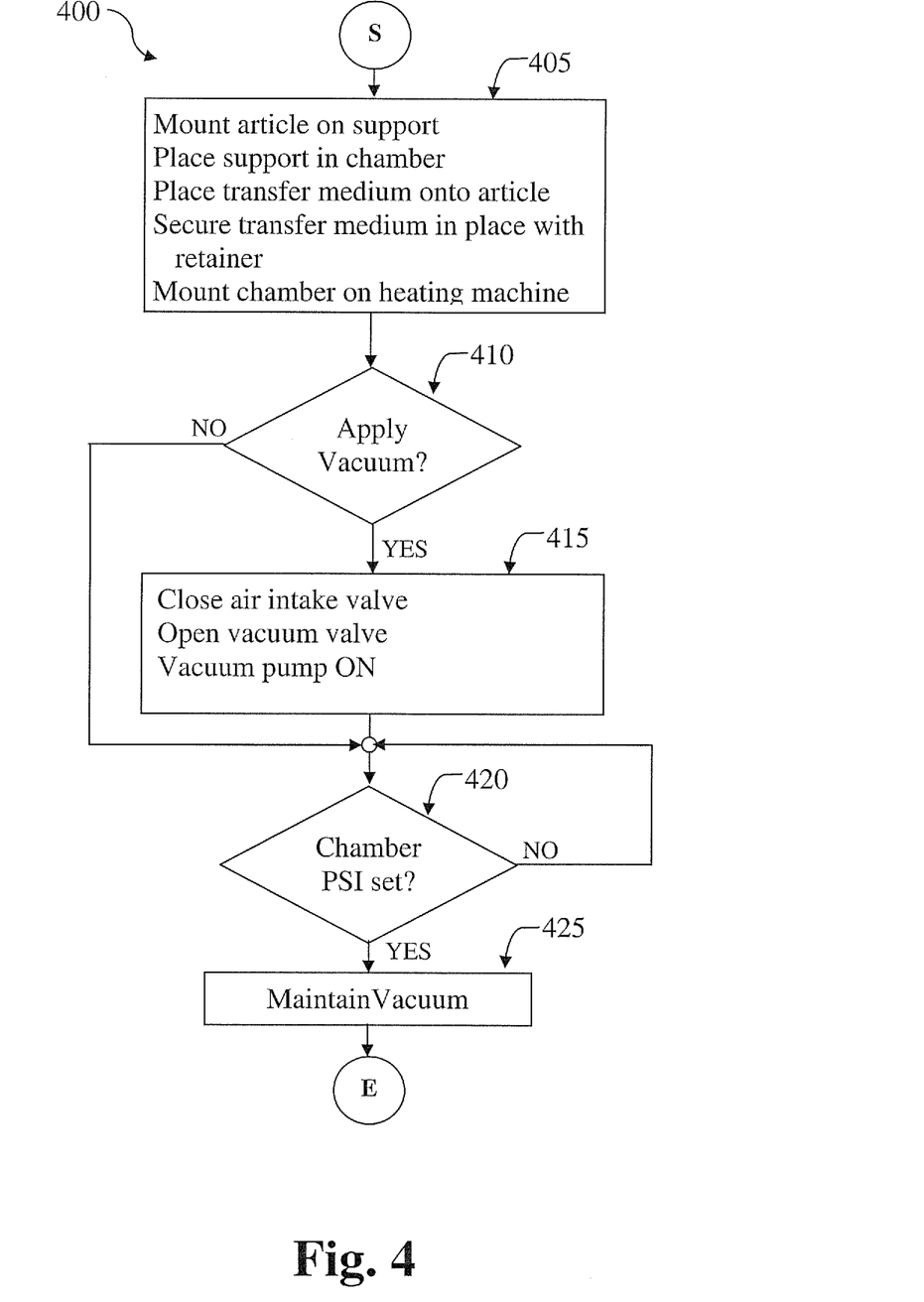
FIG. 4 illustrates a diagram of the steps for preparing an article for transferring a decorative image to the article according to some embodiments.

FIG. 4 illustrates a diagram of the steps for preparing an article for transferring a decorative image to an article according to some embodiments. At step 405, the article to be decorated 299 (FIGS. 2C and 2D) is mounted on a support 220 (FIG. 2C), and the support 220 and article 299 are placed inside the chamber 210 (FIG. 2D). A decorative transfer medium 112B (FIG. 2D) is then positioned over the article 299 to be decorated, with the dye diffusion ink side of the transfer medium facing the article to be decorated. A retaining frame 230 (FIG. 2D) is secured to the chamber 210 (FIG. 2D), thereby holding the decorative transfer medium 112B in a fixed position relative to the chamber frame and the support and article to be decorated, inside the assembled chamber. At step 410, if the vacuum source 320 (FIG. 3) is to be used, then the clean air intake valve 332 (FIG. 3) is closed, the vacuum source valve 334 (FIG. 3) is opened, and the vacuum source 320 is turned on until a set vacuum pressure is achieved. If the set vacuum pressure is achieved at step 420, then at step 425 the vacuum source 320 is turned off or throttled back to maintain the set vacuum pressure.

Figure 5:
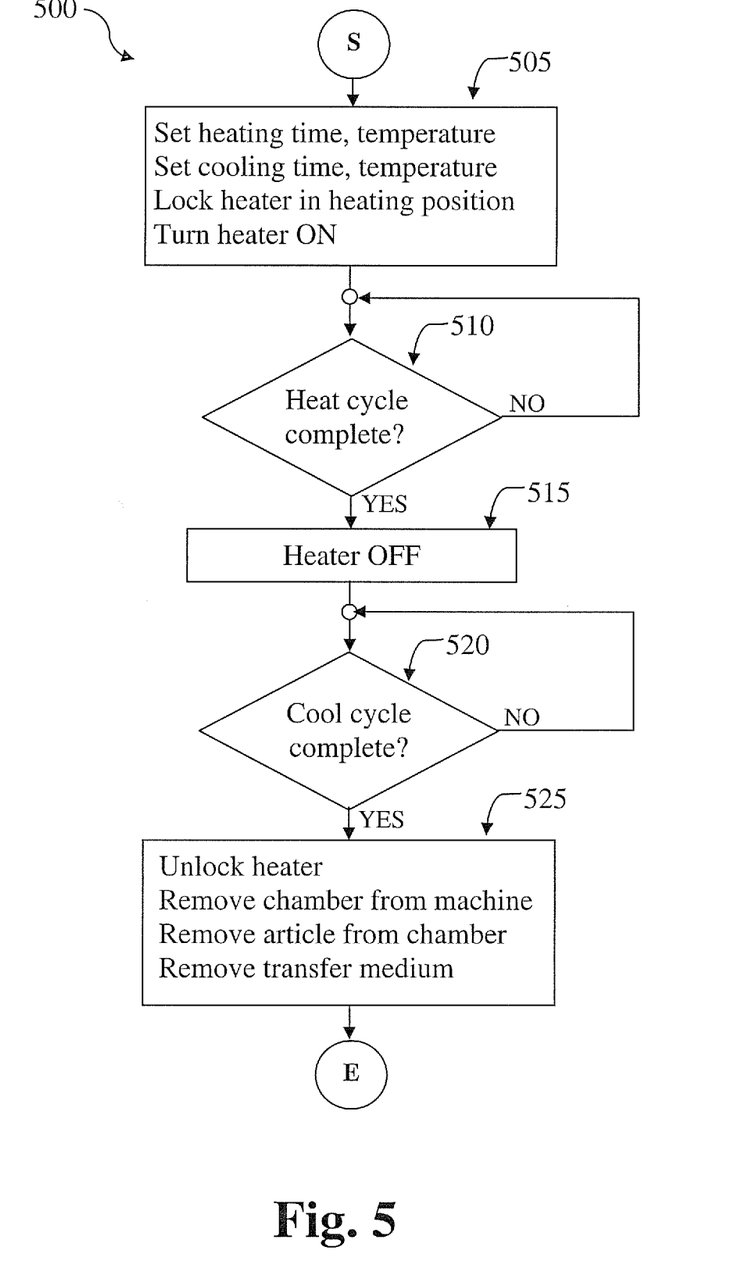
FIG. 5 illustrates a diagram of the steps for transferring a decorative image to an article according to some embodiments.

FIG. 5 illustrates a diagram of the steps for transferring a decorative image to an article according to some embodiments. At step 505, a heating cycle time and temperature are set, an optional cooling cycle time and ending temperature are set, the heater 312 (FIG. 3) is locked into the heating position and the heater 312 is turned on, starting the heat cycle. When the heat cycle is completed, at step 510, then the heater 312 is turned off at step 515 and the optional cooling cycle begins. The cooling cycle can be a preset time which for which the heat source 312 is off but the heat source cannot be raised to remove the assembled chamber 250 (FIG. 3). After the heat source is off, the cooling cycle can further be a temperature set point to which the assembled chamber 250 must drop before the heat source 312 can be raised to remove the assembled chamber 250. The cooling cycle can further include opening the air intake valve 332 (FIG. 3), opening the vacuum valve 334 (FIG. 3), and turning on the vacuum pump 320 (FIG. 3) to draw cool air into assembled chamber 250. Alternatively, the cooling cycle can be any combination of the above described cooling cycles. The heat cycle is complete when the selected temperature has been applied to the chamber for the set time. Alternatively, the heat cycle is able to be completed by manual interruption (not shown). When the cooling cycle is complete at step 520, then at step 525 the heater 312 is unlocked from its heating position, the chamber 250 (FIG. 2D) is removed from the machine 310 (FIG. 3) for transferring a decorative image to an article, the article is removed from the chamber, and the used decorative transfer medium is removed from the article to be decorated. The cooling cycle is completed when the chamber temperature has been at, or below, a selected temperature for a selected period of time. Alternatively, the cooling cycle is able to be completed by manual interruption. In some embodiments, the cooling cycle is optional. Setting the cooling time to zero, or setting the cooling temperature to a value above the heat cycle temperature, are examples of ways to logically render the cooling cycle optional. Embodiments using the personal computer 120 (FIG. 1) to automate the decorative transfer process can utilize other methods to make the cooling cycle optional such as unlocking the heat source 312 from the chamber 250 after completion of the heating cycle.

In operation, a decorative image is acquired which is to be imprinted on a transfer medium using dye diffusion ink. The decorative image is able to be acquired by scanning the image into a scanner to produced a PDF, JPEG, BMP or other known image file. The decorative image is further able to be acquired by submission of an image to an image imprinting system by a customer via uploading from the customer's personal computer, emailing the image from the customer to the image imprinting system, or copying the image from a storage device. The image is able to be multi-colored, and multiple colors of inks can be used. Alternatively, a multi-colored image is able to be imprinted to a transfer medium with a single color of ink using gray-scale equivalents of colors. The transfer medium is able to comprise a thin film such as PET (polyethylene terephthalate), polypropylene film, or thermoformable polyolefin with resin blends.

The article to be decorated is placed inside a chamber having a support to receive the article. The support is able to be a simple, flat surface to receive the article such as the bottom of the chamber. Alternatively, the support may be a custom support to firmly support the article to be decorated at a specific location within the chamber such that the surface to be decorated is substantially planar with the top opening of the chamber holding the article. The top surface of the article to be decorated is able to protrude slightly above the planar opening of the chamber to improve the contact between the surface to be decorated and the placement of the decorative transfer medium upon the surface to be decorated. The decorative transfer medium containing the decorative image is larger than the planar opening of the chamber. A retaining frame is placed over the decorative transfer medium and the retaining frame is firmly affixed to the chamber, thereby holding the decorative transfer medium position fixed with respect to the chamber and the surface to be decorated. The chamber is able to comprise a vacuum port for drawing a vacuum inside the chamber to improve contact between the decorative transfer medium and the article to be decorated. If the vacuum feature is utilized, then the retaining frame is able to be affixed to the chamber such that the inside of the chamber is substantially air tight. After securing the retaining frame, a heat source is applied to the chamber. In some embodiments, the heat source is removably coupled to the chamber to localize the heat. The heat source is applied at a selected temperature for a selected time, then the heat source is removed and the chamber is allowed to cool. In some embodiments, the chamber is able to be cooled by evacuating the heated air within the chamber by the venting or using the vacuum source. The used decorative transfer medium is then removed, and the article is decorated with the decorative image.

The present invention has been described in terms of specific embodiments incorporating details to facilitate the understanding of principles of construction and operation of the invention. Such reference herein to specific embodiments and details thereof is not intended to limit the scope of the claims appended hereto. It will be readily apparent to one skilled in the art that other various modifications are able to be made in the embodiment chosen for illustration without departing from the spirit and scope of the invention as defined by the claims.

What is claimed is:

1. A method of decorating an article by dye diffusion comprising:
    a. placing the article to be decorated into a chamber having an air inlet, a vacuum outlet, and a support for the article, wherein the air inlet provides a sealable channel between the outside air and the chamber;
    b. placing a transfer medium having a decorative image comprising a diffusion ink onto a face of the article to be decorated;
    c. fixedly securing the transfer medium to the chamber with a retaining frame such that the transfer medium forms a substantially air-tight seal with the chamber and the transfer medium is stationary with respect to the chamber;
    d. heating the chamber to a selected temperature for a selected time, thereby diffusing the diffusion ink into the article to be decorated; and
    e. cooling the chamber by opening an air intake valve coupled to the air inlet and a vacuum valve coupled to the vacuum outlet and turning on a vacuum pump coupled to the vacuum outlet such that outside air is drawn into the chamber through the air inlet;

thereby decorating the article by dye diffusion.

2. The method of claim 1, further comprising removing the transfer medium after heating the chamber.

3. The method of claim 1, wherein the article is manufactured from a material in the group consisting of: plastic, wood, glass, ceramic, stone, leather, and metal.

4. The method of claim 1, further comprising changing the air pressure within the chamber after securing the transfer medium to the chamber.

5. The method of claim 4, wherein changing the air pressure within the chamber comprises reducing the air pressure within the chamber.

6. The method of claim 1, wherein the selected temperature is in the range 120° C. to 300° C.

7. The method of claim 1, wherein the selected time is in the range 5 minutes to 45 minutes.

8. The method of claim 1, wherein when the transfer medium is fixedly secured to the chamber with the retaining frame, at least a portion of a top surface of the transfer medium is exposed, and further comprising:

rotatably positioning a heat source above the chamber; and exhausting out hot air within the heat source via heat exhaust that is coupled the heat source.

* * * * *